United States Patent [19]

Sachs et al.

[11] Patent Number: 5,044,621
[45] Date of Patent: Sep. 3, 1991

[54] AUTOMATIC FILM-LOADING DEVICE FOR SHEET-FILM CASSETTES

[75] Inventors: Guenter Sachs; Hans-Peter Wuerschum, both of Ostfildern, Fed. Rep. of Germany

[73] Assignee: Eastman Kodak Company, Rochester, N.Y.

[21] Appl. No.: 458,699

[22] PCT Filed: May 16, 1988

[86] PCT No.: PCT/EP88/00421
§ 371 Date: Nov. 16, 1989
§ 102(e) Date: Nov. 16, 1989

[87] PCT Pub. No.: WO88/09524
PCT Pub. Date: Dec. 1, 1988

[30] Foreign Application Priority Data

May 20, 1987 [DE] Fed. Rep. of Germany ....... 3716903

[51] Int. Cl.[5] ............................................. B65H 5/08
[52] U.S. Cl. ...................................... 271/11; 378/181; 378/182; 271/107; 271/9; 271/264; 271/272
[58] Field of Search ............... 271/4, 5, 10, 11, 14, 271/107, 296, 272, 300, 9, 264, 375, 187, 81, 83, 13; 378/181, 182; 354/339

[56] References Cited

U.S. PATENT DOCUMENTS

| | | | |
|---|---|---|---|
| 1,599,696 | 9/1926 | Wartz | 378/181 |
| 3,363,816 | 1/1968 | Maddock | 271/273 |
| 3,582,063 | 7/1971 | Gnage | 271/5 |
| 4,009,877 | 3/1977 | Ward | 271/264 |
| 4,150,297 | 4/1979 | Borggten | 378/181 |
| 4,887,060 | 12/1989 | Kaneko | 271/296 |
| 4,901,996 | 2/1990 | Schlough | 271/11 |

FOREIGN PATENT DOCUMENTS

| | | |
|---|---|---|
| 0052159 | 5/1982 | European Pat. Off. . |
| 0123053 | 10/1984 | European Pat. Off. . |
| 3000760 | 7/1981 | Fed. Rep. of Germany . |
| 3306720 | 9/1983 | Fed. Rep. of Germany . |
| 88/006749 | 9/1988 | World Int. Prop. O. . |

Primary Examiner—H. Grant Skaggs
Attorney, Agent, or Firm—G. Herman Childress

[57] ABSTRACT

A device for moving film from a supply magazine to a cassette loading station, the film removing device being in a unit with a film holding channel formed by parallel groups of rollers which engage opposed edges of the film.

1 Claim, 4 Drawing Sheets

_5,044,621_

AUTOMATIC FILM-LOADING DEVICE FOR SHEET-FILM CASSETTES

TECHNICAL FIELD

The invention relates to a device for loading a sheet film into a sheet-film cassette, said device comprising a plurality of sheet-film supply magazines and a sheet-film transfer device movable between a selected supply magazine and a cassette-loading station, further comprising a sheet-film holder which has a guide channel for receiving a sheet film and also comprising a sheet-engaging device movable along the guide channel of the sheet-film holder, said sheet-film holder and sheet-engaging device forming a jointly movable unit, according to German patent application P 37 05 851 .7, filed Feb. 24, 1987; International (PcT) publication no. WO 88/06749 published Sept. 7, 1988. The holder has a plurality of rotatably mounted rollers which define the position of the sheet in the holder.

BACKGROUND ART

In the case of the device according to the above reference Pct publication, it may happen that the sheet film removed from a supply magazine by a sheet-gripping device and moved into a sheet-film holder to be transported to a cassette-loading station abuts the walls of the sheet-film holder or slides along said holder. Due to the mechanical force which is thus exerted on the sheet film, the film may be damaged or impaired by pressure marks and/or other defects caused by increased frictional contact with the metal-sheet film holders. Of possible pertinence are Auslegeschrift 1810257 and 1943660.

DISCLOSURE OF THE INVENTION

The sheet-film holder of the present invention handles the film reliably and protected from damage, due to the use of rotatably mounted rollers to define the film guide channel in the holder. The rollers are preferably arranged at those locations of an arcuate guide channel at which the front edge of a sheet film fed into the sheet-film holder has to be deflected.

Further in accordance with a preferred embodiment, the support of the rollers consists of two identically shaped mounting sections arranged at a distance from, and parallel to each other, with the sheet engaging device being arranged between said sections. Preferably the support of the rollers and the sheet engaging device is mounted to a rectilinearly guided guide member on which the sheet engaging device is mounted for pivotal movement concentrically with the guide channel defined by the rollers.

Due to the particular design of the sheet-film holder with a guide channel defined by the rollers, the sheet film is guided reliably and smoothly so that it cannot be interfered with in any undesired manner.

BRIEF DESCRIPTION OF THE DRAWINGS

Further features and advantages can be inferred from the description of embodiments of the invention illustrated in the drawings and from the subclaims. In the drawings.

MODES OF CARRYING OUT THE INVENTION

Figure 1:
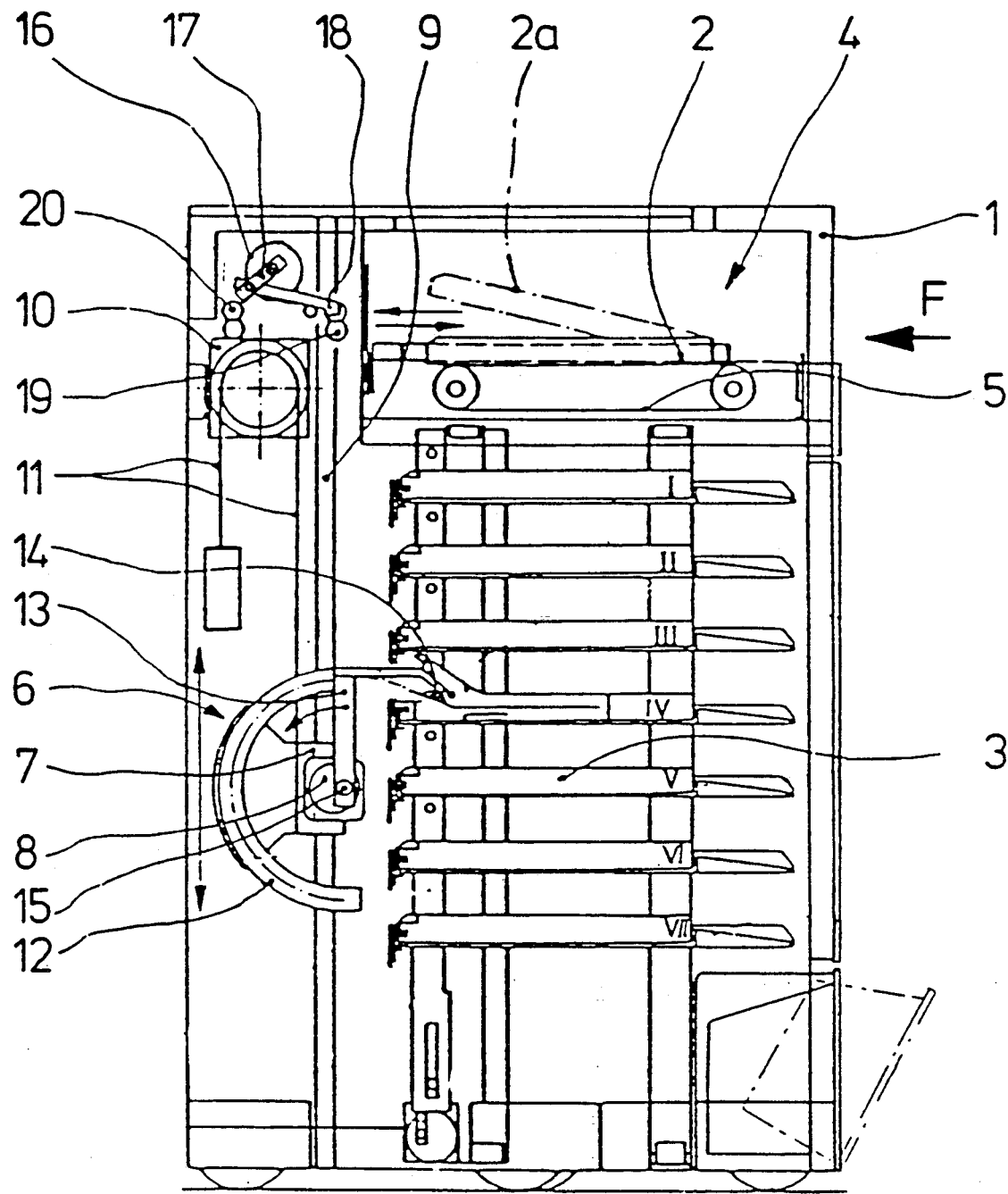
FIG. 1 is a lateral sectional view of the device.

The subject matter of the invention relates to the special design of a sheet-film holder 12 in a device 1 for unloading and reloading X-ray film cassettes according to the above referenced Pct publication.

The device comprises a light-tight housing 1 in which a plurality of supply magazines 3 are arranged one above the other. Each of the supply magazines 3 houses a different film size.

Above the supply magazines 3, a light-tight cassette unloading and reloading station 4 is arranged in which a cassette 2 is positioned such that it can be introduced and removed on a transport belt 5. Opening means for operating the upper cassette portion 2a, which are of a known type and not illustrated, are arranged in the unloading and reloading station 4.

A suction arm 18 movable by a crank drive 16, 17 is located beside the unloading and reloading station 4 and serves to remove a sheet film from cassette 2 and transfer said sheet film to the transport rollers 19. The transport rollers 19 and transport rollers 20 connected to them serve to feed an exposed sheet film from the unloading and reloading station 4 to a film developing apparatus of a known type (not illustrated) which is connected to the device in a light-tight manner.

The supply magazines 3 are associated with a sheet-film transfer device 6 which is movable in the vertical direction along the end sides of the supply magazines 3 up to the unloading and reloading station 4. The sheet-film transfer device 6 is mounted to a guide member 7 by means of which it is shiftably guided on a guide column 9 and movable vertically by means of a chain 11 driven by a stepping motor 10.

Figure 2:
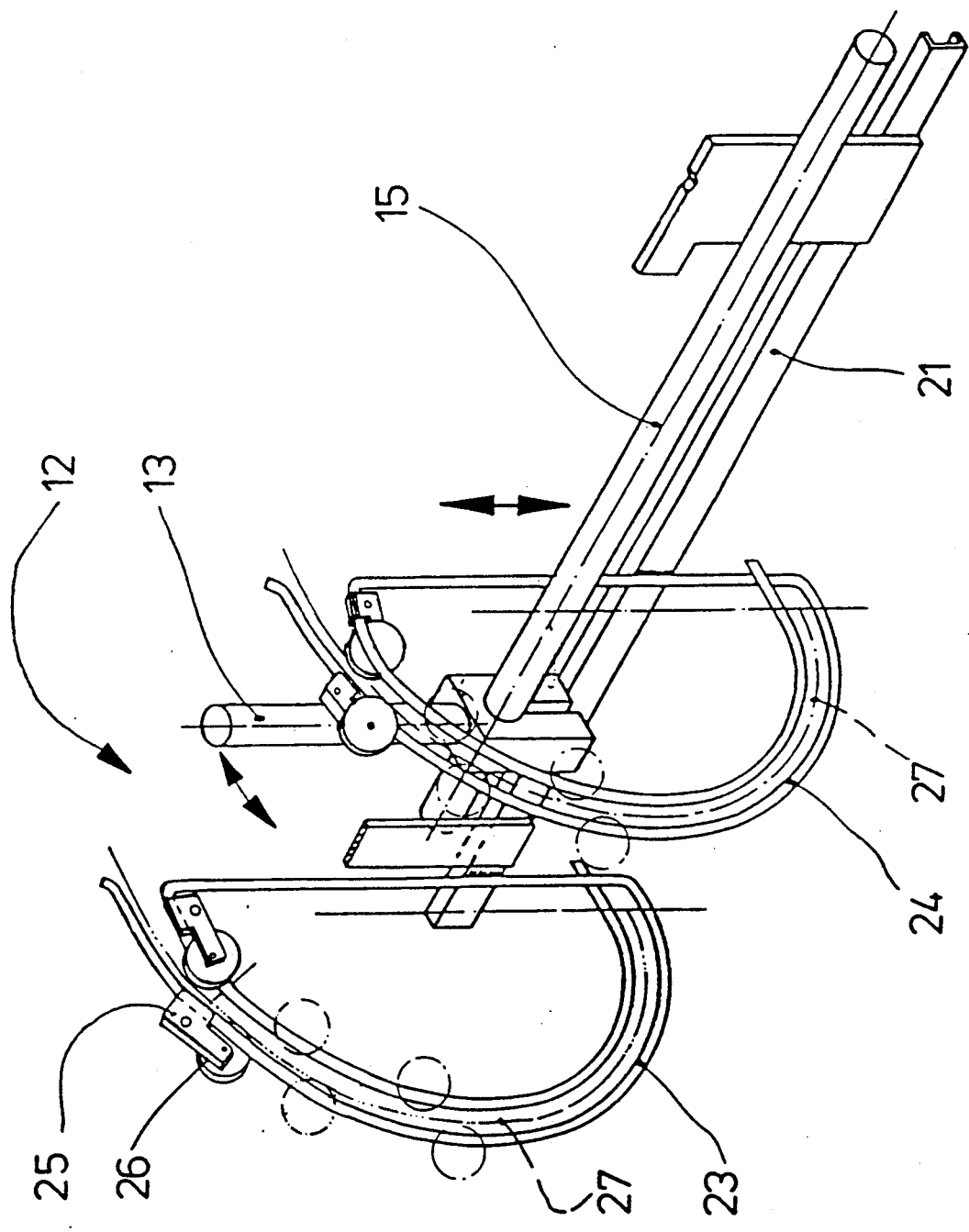
FIG. 2 is an inclined partial view of the device according to FIG. 1.

The sheet-film transfer device 6 is mounted to the guide member 7 via a mounting rail 21 (see FIG. 2) on which an electric motor 8 with a motor shaft 15 is also mounted. A suction arm 13 at the free end of which a suction bar—not illustrated in detail—with a plurality of suction elements 14, is mounted on the motor shaft 15 of the electric motor 8.

The sheet-film transfer device 6 comprises a sheet-film holder 12 with two supports 23 and 24 mounted to the mounting rail 21, said supports carrying holders 25 with rotatably mounted rollers 26. The supports 23 and 24 consist of wire portions of identical design which are arranged at a distance from, and parallel to each other. The supports 23 and 24 form arcuate parallel channels which are concentrical with motor shaft 15 and have an entrance opening positionable above the supply magazines 3 and the cassette 2, respectively, and facing them, the channels being closed at the other end. It is apparent that the sheet seizing device 13 moves concentrically with the channel formed by the rollers.

The holders 25 with the rollers 26 are mounted on the supports 23 and 24 by clamps or the like and are distributed such that a sheet film introduced into the sheet-film holder 12 is guided over an arcuate path by lateral film edge engagment only with the rollers 26 and without the supports 23, 24 being contacted by it. The clamping of the rollers 26 to their supports is advantageous in that the positions of the rollers 26 can thus be individually adjusted. Suction arm 13 is situated between the supports 23 and 24, with its film engaging suction elements 14 moving along a guide path 27 as defined by the rollers 26.

The film engaging surface of the rollers 26 is relatively soft and electrically insulating in that it is, for example, rubber-coated or coated with foamed plastic so that the sheet film cannot abruptly impinge upon the holder and a sudden static discharge is avoided. Due to this design of the rollers 26, the sheet film is safely guided and cannot be damaged and/or impaired by pressure marks and/or other defects caused by increased frictional contact.

Figure 3:
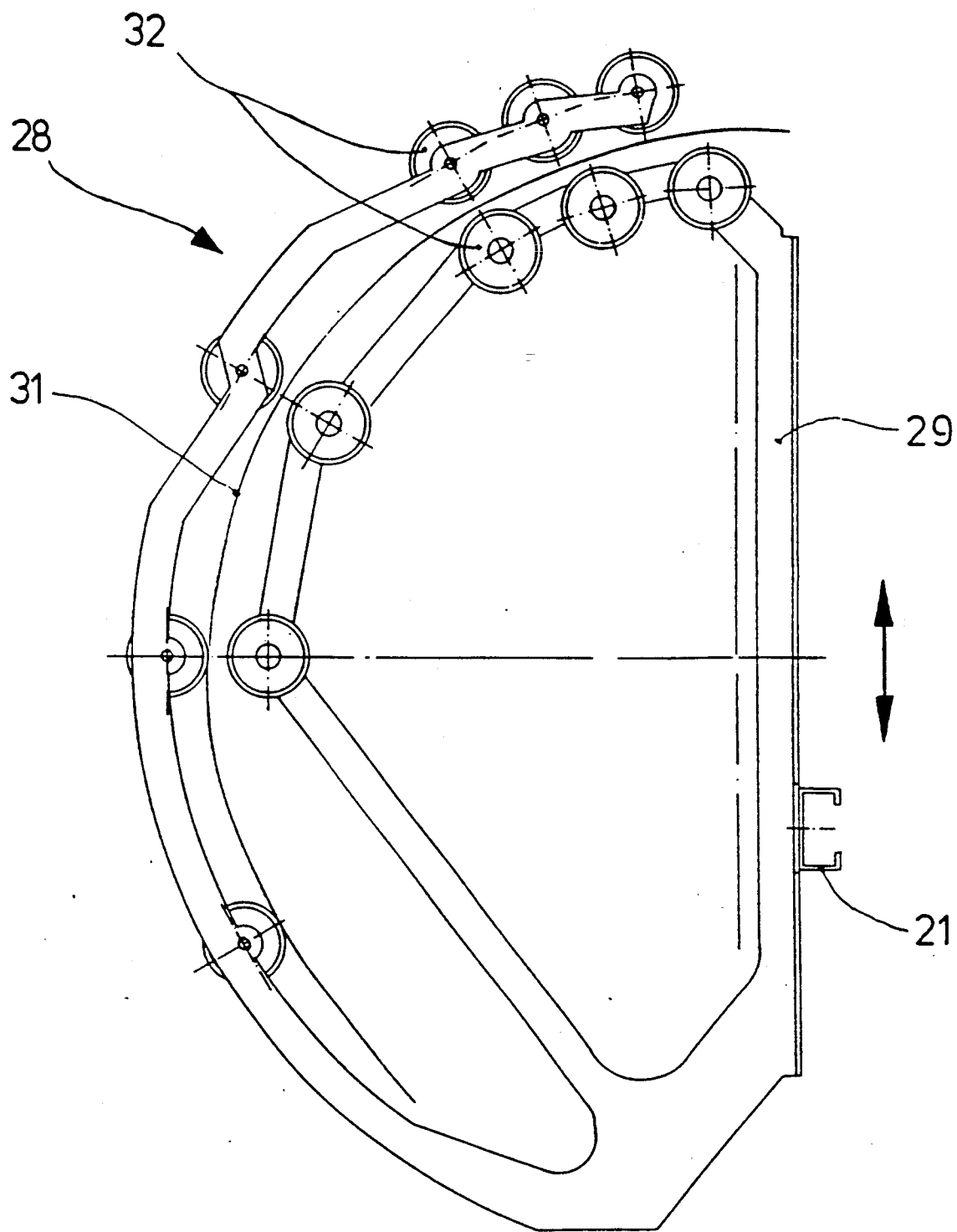
FIG. 3 is a lateral view of another embodiment of a sheet-film holder.
Figure 4:
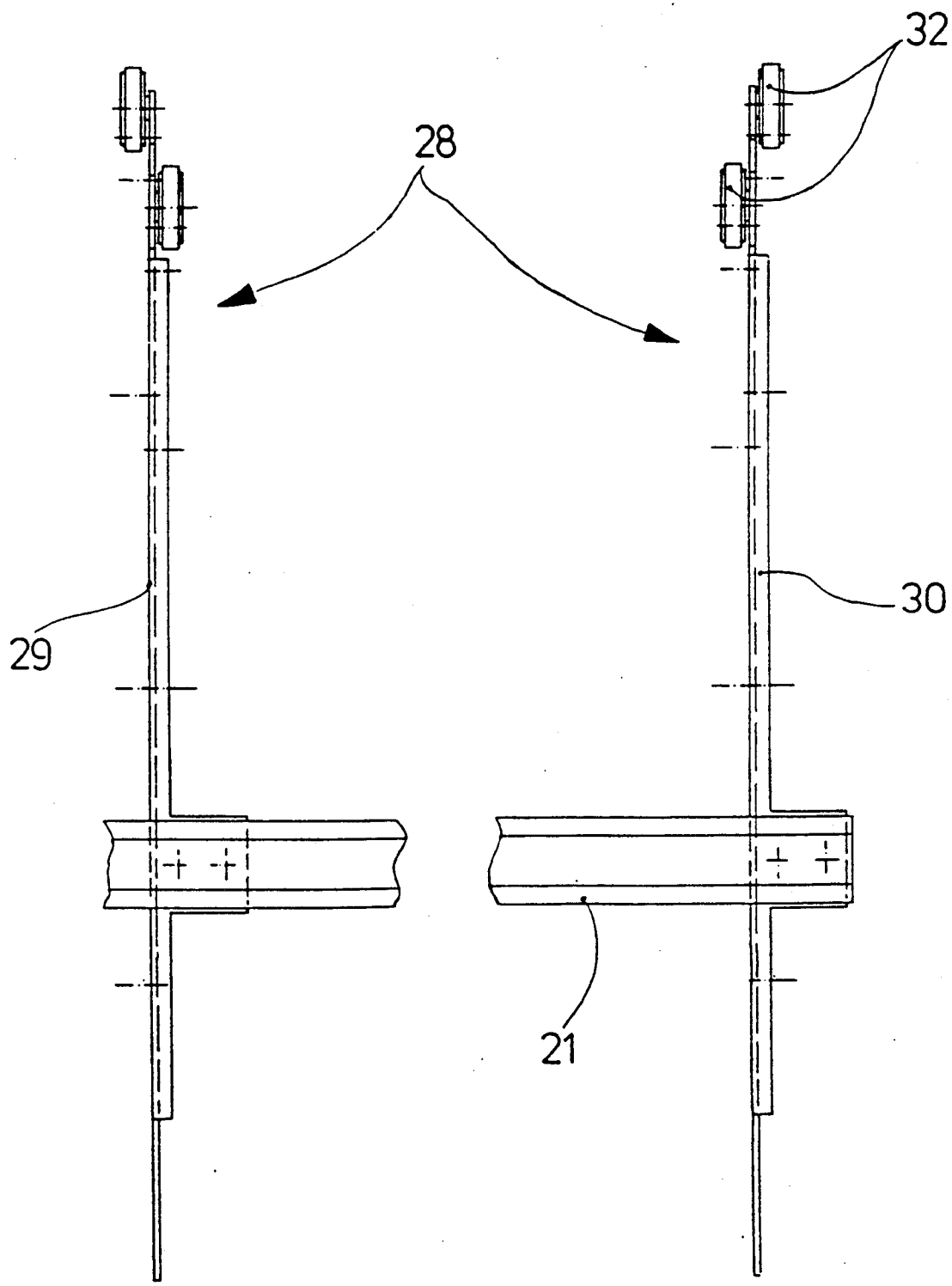
FIG. 4 is a front view of the device according to FIG. 3.

In another embodiment the supports of the sheet-film holder can be designed as illustrated in FIGS. 3 and 4, i.e. as identical mounting frames 29, 30 made from sheet metal. The rollers 32 are directly mounted for rotation on the mounting frames 29, 30. The mounting frames 29, 30 along with the rollers 32 also form a channel open at the top in which a sheet film 31 introduced into the sheet-film holder 28 is guided over an arcuate path along the rollers 32 only and does not contact the mounting frames 29, 30. All other components of the device are the same as described in connection with the embodiment according to FIGS. 1 and 2.

The sheet-film holders 12 and 28 respectively serve to guide a sheet film 31 removed by suction device 13, 14 from a supply magazine 3, to hold said sheet film during a vertical lifting movement of the sheet-film transfer device 6 and to guide it when it is transferred to a cassette 2. Thus the holders and the sheet engaging suction device move as a unit.

The device functions as follows:

The functional sequence is presented in a simplified form. Details can be obtained from the above referenced Pct publication.

With reference to FIG. 1, cassette 2 which is to be unloaded and reloaded respectively is shifted in the direction of the arrow "F" into the unloading and reloading station "4" at the front side of the apparatus where it is transported to an end abutment by transport belt 5. When the final position has been reached the upper cassette portion 2a is opened by means not illustrated. With the aid of the sheet-film removal device 16, 17 the exposed film is seized by suction arm 18 and fed to the transport rollers 19 which transport the exposed film via transport rollers 20 to the film-developing apparatus arranged downstream.

In response to the size (sheet-film format) of the cassette 2 introduced into the device, which is determined in the unloading and reloading station 4, the sheet-film transfer device 6 is moved from an initial position to that removal position in which a supply magazine 3 is available which accommodates the sheet film size matching the cassette size. Each removal position I to VII is associated with a code which indicates the sheet-film size accommodated in each of the supply magazines 3 and supplies such information to a control device.

When the sheet-film size has been determined to match the size of the cassette 2 introduced into the device, stepping motor 10 moves the sheet-film transfer device 6 via drive chain 11 to the appropriate removal position.

During such lifting movement the sheet-film transfer device 6 assumes a retracted initial position in which it is freely movable in the vertical direction relative to the supply magazines 3. After the selected removal position of the sheet-film transfer device 6 has been reached, the sheet-film is removed from the corresponding supply magazine 3. For this purpose suction arm 13 is pivoted clockwise from its retracted initial position by motor 8. During such pivotal movement the suction elements 14 are moved across the front section of the sheet-film supply stack into the open supply magazine 3, are lowered onto the uppermost film sheet and, by operation of a vacuum pump, a sheet film is seized by the suction elements 14.

The sheet film is removed from this sheet-film removal position in that suction arm 13 is pivoted counterclockwise and during such operation draws a sheet film 31 into the sheet-film holder 12 and 28 respectively. The counterclockwise pivotal movement of suction arm 13 is continued until the rear end of sheet film 31 has been drawn into the sheet-film holder 12 and 28 respectively and suction arm 13 has been arrested by switching off of motor 8.

During such transport of sheet film 31 into the sheet-film holder 12 and 28, respectively, rollers 26 and 32, respectively, provided on the supports 23 and 24 and on the mounting frames 29 and 30, respectively, prevent the front edge of sheet film 31 from abutting against the inner edges of the supports 23 and 24 and of the mounting frames 29 and 30 respectively.

Now the sheet-film removal operation has been completed; it is followed by the sheet-film transfer to the cassette unloading and reloading station 4. For this purpose the total sheet-film transfer device 6 is moved upwardly by stepping motor 10 until it reaches a predetermined transfer position in which stepping motor 10 is arrested.

In the transfer position, suction arm 13 is pivoted clockwise by motor 8. During such operation the sheet film 31 is shifted into cassette 2 through the guide channel 27 of sheet-film holder 12 and 28, respectively, said guide channel being aligned with respect to the open cassette 2. When the suction elements 14 have reached the final position, they are ventilated. The suction device 13, 14 has shifted the sheet film 31 into cassette 2 to such an extend that after ventilation of the suction elements 14, it drops exactly into the space provided for such purpose in cassette 2.

Subsequently suction arm 13 carries out a counterclockwise pivotal movement until it reaches a predetermined retracted initial position in which the sheet-film transfer device 6 can be freely moved in the vertical direction. When suction arm 13 has reached its initial position as explained above the total sheet-film transfer device 6 is moved vertically up to a middle removal position by stepping motor 10. Starting from the middle removal position a new sheet-film transfer cycle can then be started as described.

Cassette 2 loaded with a sheet film in the unloading and reloading station 4 is closed by means not illustrated and fed out of the device by transport belt 5 in a direction opposite to the direction of the arrow "F".

In a modification the sheet-film holder rather than comprising an exclusively arcuate guide and holding arrangement for the sheet film may also comprise (not illustrated) a guide which is rectilinear in some areas followed by an arcuate portion and is formed by correspondingly arranged rollers and a correspondingly designed suction device. An embodiment of such a design of a sheet-film holder which is not illustrated can be inferred from the above referenced Pct publication, FIG. 12 (without guide rollers).

The invention has been described with reference to a preferred embodiment. However, it will be appreciated that variations and modifications can be effected with the ordinary skill in the art without departing from the scope of the invention.

We claim:

1. In apparatus for loading sheet film, such as xray film, into a cassette from a film supply magazine, wherein a sheet is removed from the magazine by a device which moves it into a holder in which it is carried to a cassette loading station, the improvement wherein:

said holder comprises a pair of spaced, identical edge guides for the lateral edges of the film sheet, each edge guide comprising two concentric, arcuate wire portions spaced apart to provide a guide channel which receives an edge portion of a sheet, and roller means carried by said wire portions to engage said edge portions.

* * * * *